(12) United States Patent
Goede

(10) Patent No.: US 6,254,838 B1
(45) Date of Patent: Jul. 3, 2001

(54) OZONE GENERATING SYSTEM FOR LAUNDRIES

(76) Inventor: Armand Jean Goede, 1015 Sunshine La., Suite 101-A, Altamonte Springs, FL (US) 32714

(*) Notice: Subject to any disclaimer, the term of this patent is extended or adjusted under 35 U.S.C. 154(b) by 0 days.

(21) Appl. No.: 09/360,173

(22) Filed: Jul. 23, 1999

(51) Int. Cl.[7] .................................... B01J 19/08
(52) U.S. Cl. ................. 422/186.12; 422/186.07
(58) Field of Search ........................ 422/186.07, 186.12

(56) References Cited

U.S. PATENT DOCUMENTS

| | | | |
|---|---|---|---|
| 2,864,757 | * 12/1958 | Balcar et al. | 422/186.08 |
| 5,097,556 | 3/1992 | Engel et al. | 8/158 |
| 5,181,399 | 1/1993 | Engel et al. | 68/13 R |
| 5,241,720 | 9/1993 | Engel et al. | 8/158 |
| 5,493,743 | 2/1996 | Schneider et al. | 8/149.2 |
| 5,843,307 | * 12/1998 | Faivre et al. | 422/186.08 |

* cited by examiner

Primary Examiner—Kathryn Gorgos
Assistant Examiner—Thao Tran
(74) Attorney, Agent, or Firm—J. Sanchelima

(57) ABSTRACT

A system for generating water with predetermined amount of ozone dissolved and minimum entrained ozone. The system includes the use of an entrained gas separator assembly in series with the recirculating plumbing feeding and discharging ozone enriched water. The novel entrained gas separator assembly allows the water with dissolved ozone to pass through while extracting the entrained ozone for subsequent use or destruction. The entrained gas separator includes a secondary tank with an off gas valve for releasing the entrained gases including ozone. A cylindrical member with a helicoidal wall and centrally perforated tube defines a helicoidal path that forces the water down allowing the entrained ozone to pass through. The ozone concentration is kept within predetermined levels with the use of an ozone analyzer mounted close to the outlet of the holding or contact tank, as well as a number of sensors and bypass valves that are computer controlled. The ozone rich water from the tank's outlet is passed through a water conditioner prior to being delivered for use.

6 Claims, 2 Drawing Sheets

OZONE GENERATING SYSTEM FOR LAUNDRIES

BACKGROUND OF THE INVENTION

1. Field of the Invention

The present invention relates to an ozone generating system for laundries, and more particularly, to such a system where the concentration of dissolved ozone in the water can be regulated with accuracy and safety.

2. Description of the Related Art

Ozone is an unstable gas with bleaching characteristics. In contrast with chemical bleachers, ozone is ecologically compatible. Also, in comparison with many applications where chemical bleaches are used, an ozone-based system also enjoys electrical and/or gas energy savings since it can operate at lower temperatures.

For ozone to be effective its concentration in water needs to be controlled. The problem with the patented inventions in their commercialization has been insufficient control over the concentration levels used in the laundry applications. Keeping the ozone concentration levels under control directly contributes to the maximization of the efficiency of the system. The present invention achieves a high degree of accuracy and consistent levels of dissolve ozone in the mixing tanks for subsequent delivery to the wash wheel during a linen washing process.

It is understood that the ozone laundry system is capable of achieving the reductions in laundry detergent, bleach (sodium hypochlorite), wash water temperature and overall water consumption through a number of mechanisms. Because ozone is a very strong oxidizer, it can break the long carbon chains that make up the hydrophobic oils in dirtied linens. when ozone breaks these insoluble carbon chains it leaves a polar end group that allows the carbon fragment to become more soluble in water, much liken to action of the surfactants in the laundry detergent. By this action the ozone can substantially reduce the work required by the laundry detergent in removing the soils and oils in the linens. Therefore, the amount of laundry detergent that is used can be reduced significantly. Also, the need for hot water is reduced or eliminated by the same action of the dissolved ozone.

Also, through the oxidizing activity of the dissolved ozone, the organic color bodies that make up the various stains can be decolorized or bleached, liken unto the action chlorine bleach. Unlike the chlorine, though, ozone does not leave behind toxic chlorination by products that can remain in the fabric of the linens. Therefore, in properly designed systems the use of chlorine bleach can be completely eliminated.

Concurrently, compared to the other available oxidizing chemicals, including chlorine, ozone is the most powerful disinfectant. Ozone's effective sterilizing capability is 100's of times greater than that of chlorine. Therefore, the application of ozone in the wash process will completely ensure that the linens are properly sterilized from all bacteria and viruses.

Given that the laundry detergent can be significantly reduced and the chlorine eliminated, then the amount of rinse water can also be reduced.

Applicant believes that the closest reference corresponds to U.S. Pat. Nos. 5,493,743; 5,097,556; 5,181,399 and 5,241,720 assigned to Tri-O-Clean Laundry, Inc. However, they differ from the present invention because they lack the necessary controls to keep the concentration of ozone in water regulated within a predetermined and relatively narrow range for more effective utilization of ozone for particular purposes. Also, the amount of entrained ozone in these patented devices makes them very dangerous. The present invention utilizes a novel device for separating practically all of the entrained gas by forcing the water down a helicoidal path while permitting the entrained gas to exit through a perforated centrally disposed tubular member. The entrained gas typically shows in the water with a milky look that clears as the small bubbles of the entrained ozone go out to the atmosphere. It is dangerous to expose users to ozone constantly. Thus, the desirability of destroying the excess of ozone.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device for accurately controlling the concentration of the ozone dissolved in the water of a continuous supply system.

It is another object of the present invention to provide a device that is safe to operate by effectively removing excess entrained ozone from the water.

It is still another object of the present invention to provide a device that can be safely operated to provide a source of enriched ozone water for laundry applications.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
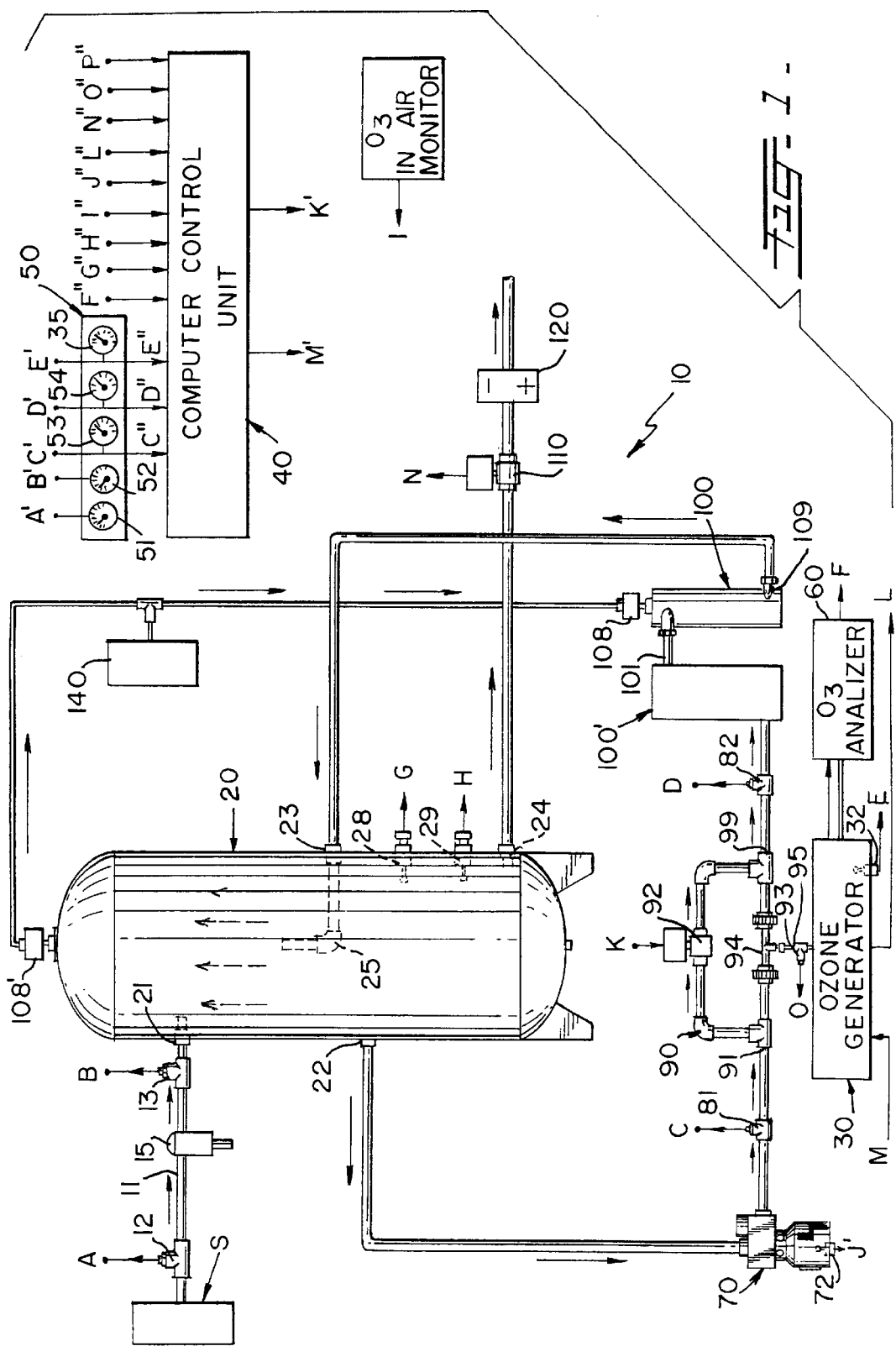
FIG. 1 is an schematic representation of one of the preferred embodiments for the present invention.

Referring now to the drawings, where the present invention is generally referred to with numeral 10, it can be seen that the present invention comprises contact or holding tank assembly 20 with inlet 21 connected to a tap water supply S, tank outlet 22 connects to inlet 23 through a bypass valve and Venturi assembly 90 for injecting ozone, and outlet 24 of holding tank 20 is connected through a magnetic water conditioner 120 to laundry devices (not shown) or any other application that requires using the ozone-enriched water. The concentration of ozone is monitored by computerized control unit 40 with several transducers or sensors in critical positions of the system. Suitable software programming incorporated to unit 40 provides the necessary output signals for controlling the flow of water as well as the generation and use of ozone to maintain accurate predetermined levels at outlet 24.

Referring to FIG. 1, it can be seen that a water assembly supply S is connected to water pressure regulator assembly 15 through conduit 11. In the preferred embodiment, assembly 15 is manually set to a predetermined pressure. Inlet pressure sensor assembly 12 is mounted just before water regulator assembly 15. Regulated pressure sensor assembly 13 is mounted after pressure regulator assembly 15 and connects to tank inlet 21.

Computerized control unit 40 includes a microprocessor based device having several inputs with A/D (analog to digital) converters to provide suitable digital voltages from analog signals received from transducers. The electrical outputs A and B of sensor assemblies 12 and 13 are connected to inputs A' and B' of gauge panel assembly 50 where a user can view their magnitudes. Input H" is connected to ozone in water analyzer 29 to monitor the concentration of ozone in the water thus providing an accurate measure of ozone concentration. Regulating the output of ozone generator 30 and the activation of bypass valve and Venturi assembly 90 allow a user to control the concentration of ozone. Gas separator assembly 100 is connected between the bypass valve and Venturi assembly 90 and the second inlet 23 to holding tank 20. Assembly 100 eradicates most of the ozone gas that has not been dissolved. The rest of undisolved ozone is taken away through off gas valve assembly 108'. The ozone-enriched water delivered by outlet 24 is processed in the preferred embodiment by water conditioner assembly 120 before it is used.

Contact or holding tank assembly 20 has a substantially cylindrical shape and stands upright. Inlet 21 is positioned, in the preferred embodiment, at the top, and not lower than 90% of the entire height of tank assembly 20. When the water is discharged inside assembly 20 initially, it does not have any significant amount of ozone and it will take some time to acquire it after being recirculated. Thus, this initial body of water will go out through outlet 22 when suctioned by recirculating pump 70 and through bypass valve and Venturi assembly 90. The temperature of pump 70 is sensed by temperature sensor 72 having output J connected to input J" in computerized control unit 40. Outlet 22 is located between 30% and 40% of the height of tank assembly 20.

Assembly 90 includes bypass ball valve unit 92 running parallel and above Venturi unit 94. Units 92 and 94 have a common inlet and a common outlet 91 and 99, respectively. Venturi unit 94 is connected through pipe 95 to ozone generator 30, which can be implemented with model CA CAT 1200, AT-1220, manufactured by CATEC Corp., 7011D-301 Blvd, Sarasota, Fla. 34234-3267. To increase the output of ozone, an oxygen generator is used to feed ozone generator 30, permitting a user to achieve 5–7% wt. ozone. Temperature sensor 32 senses the temperature inside ozone generator 30 and its output E is connected to unit 40 for further processing. Venturi unit 94 draws the ozone in contact with the water that is not passing through bypass ball valve unit 92. Unit 92 is electrically controlled with input K connected to output K' in computerized control unit 40. In this manner, the flow of water exposed to ozone passing through Venturi assembly 94 is regulated (selectively diverted).

Figure 2:
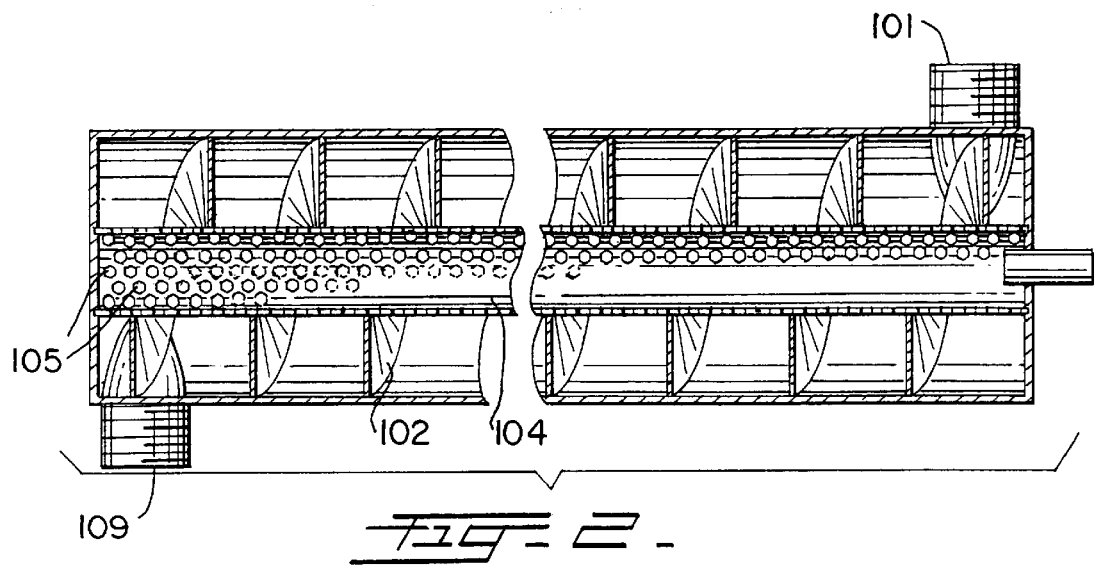
FIG. 2 is a partial view of the interior of the gas separator assembly.
Figure 3:
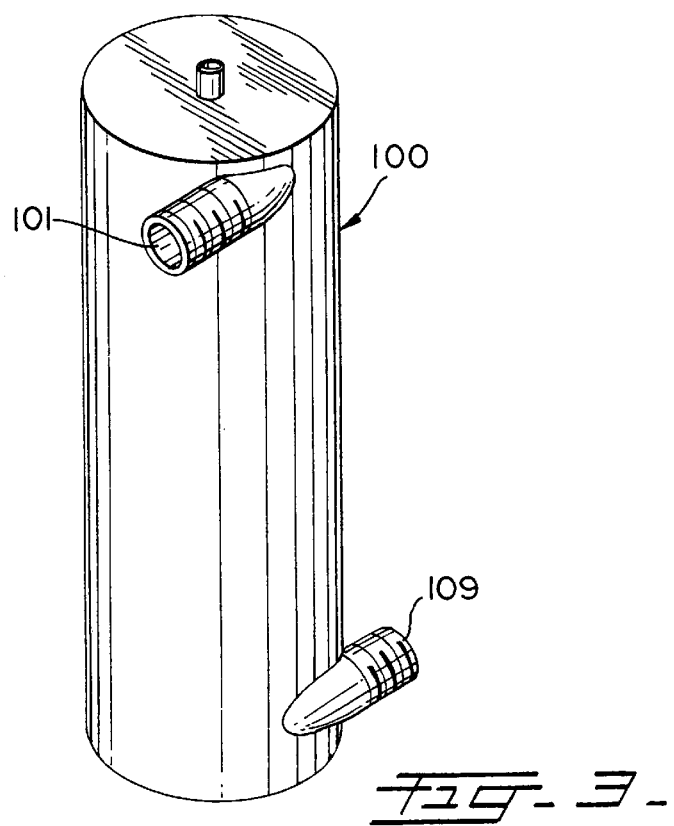
FIG. 3 is an isometric view of the gas separator.

Outlet 99 is connected to entrained gas separator assembly 100, which is more specifically shown in FIG. 2. Inlet 101 is positioned substantially at the top of assembly 100 forcing the water down through a helicoidal path defined by helicoidal wall 102. A perforated pipe 104 extends centrally in assembly 100 and perforations 105 allow the entrained gas (mostly ozone) in the helicoidal path to go through perforated pipe 104. Most of the entrained gas (not dissolved), approximately 85%, separates and is expelled through off gas valve 108 to ozone destroying assembly 140. Outlet 109 sends the water to inlet 23 of tank assembly 20. Inlet 23 is mounted preferably between 40% and 50% of the height of tank assembly 20. Elbow pipe 25 extends up about 15 cm. in the preferred embodiment to direct the water upwardly.

Tank assembly 20 includes outlet 24 located at the bottom part and not higher than 10% of the height of tank assembly 20. Ozone in water analyzer assembly 29 is mounted relatively close to outlet 24 to measure the ozone concentration being delivered.

Ozone analyzer assembly 60 can be implemented with model OA-1000 Ozone analyzer, manufactured by CATEC, 7011D-301 Blvd, Sarasota, Fla. 34243-3267.

Computerized control unit 40 includes a memory circuit for storing data and instructions. Unit 40 includes inputs A", B", C", D", E", F", G, H" and I" that are respectively connected in parallel with gauges A', B', C', D', E', F', G', H' and I' in gauge panel assembly 50 to outputs A, B, C, D, E, F, G, H and I. A user can monitor the different parameters with a visual indication in assembly 50.

The electrical inputs and outputs of computer control unit 40 are

| Inputs | Connected to output of |
|---|---|
| A" | water pressure sensor 12 |
| B" | water pressure sensor 13 |
| C" | water pressure sensor 81 |
| D" | water pressure sensor 82 |
| E" | temperature sensor of ozone generator 30 |
| F" | generator's ozone analyzer 60 |
| G" | water temperature sensor 28 |
| H" | water ozone analyzer |
| I" | ozone in air monitor |
| O" | ozone pressure sensor 93 |
| N" | flow meter 110 |
| J' | temperature sensor of recirculating pump 70 |
| Outputs | Connected to input of |
| K' | bypass valve assembly 92 |
| M' | ozone generator 30 |

The software used in assembly 40 includes alarm data for detecting when the water pressure, water temperature, water ozone concentration and/or ozone in air exceed certain predetermined parameters. With respect to water pressure assemblies 12 and 13, a control signal is delivered to water pressure regulator assembly 15 depending on the output received. The objective being to keep a certain pressure at inlet 21. Regulator assembly 15 can also shut off completely the water supplied to inlet 15, if desired. The computerized control unit 40 receives the pertinent Regulator assembly 15 can also shut off completely the water supplied to inlet 15, if desired. The computerized control unit 40 receives the pertinent data from the pressure, vacuum, temperature and ozone concentration sensors and through specialized software program, alters the ozone generator's ozone production rate and modulates the proportional motorized ball valve, K and 92 to maximize the ozone mass transfer efficiency and accurately control the predetermined ozone concentration level in the contact or holding tank 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for delivering water with a predetermined concentration of ozone, comprising:

A) a contact tank having a substantially elongated shape and positioned upright with first top and bottom ends, said first contact tank including first and second inlets and first and second outlets, said first inlet being located adjacent to said top end and being connected to a water supply, said first outlet being located below said first inlet, said second inlet being located below said first inlet and above said first outlet, and said second outlet being located adjacent to said bottom end below said first outlet and said contact tank further including a first gas off valve mounted to said first top end;

B) pump means for suctioning the water contained in said first contact tank and said pump means including a third inlet and a third outlet, said third inlet being connected to said first outlet;

C) ozone supply means having an intake port and an exit port;

D) venturi means for injecting ozone to said water, said venturi means having a fourth inlet and a fourth outlet, said fourth inlet being connected to said third outlet, and said venturi means further including a conduit connected to exit port of said ozone supply means and said venturi means further including a bypass valve means in parallel for selectively diverting the water coming through said fourth inlet;

E) means for separating entrained gas in water including a fifth inlet being connected to said fourth outlet, said means for separating entrained gas includes secondary contact tank with second top and bottom ends that receives the water at said second bottom end from said fifth inlet and further including a second off gas valve for releasing said entrained gases including ozone and said fifth outlet being connected to said second inlet and said means for separating entrained gas includes a cylindrical member having third top and bottom ends with a seventh inlet and a seventh outlet, said seventh inlet receiving the water from said second top end, and said cylindrical member includes a helicoidal wall and a centrally disposed perforated tube defining a helicoidal path between the cylindrical member and the centrally disposed perforated tube so that the water is forced downwardly through said helicoidal path and the entrained ozone passes through said perforated tube upwardly to said first off gas valve;

F) water conditioner means having a sixth inlet and a sixth outlet, said sixth inlet being connected to said second outlet, and said sixth outlet adapted to deliver the processed water to a user's application within a predetermined range of ozone concentration; and G) ozone destruction means connected to said first and second gas off valves.

2. The system set forth in claim 1 further including:

H) water pressure regulating means connected between the water supply and said first inlet so that the water pressure presented to said first inlet can be adjusted.

3. The system set forth in claim 2 further including:

I) a water ozone concentration analyzer mounted to said first contact tank in close proximity with said second outlet so that the concentration of ozone dissolved in the water is measured, said water ozone concentration analyzer including a first output.

4. The system set forth in claim 3 further including:

J) a plurality of water pressure sensing means for monitoring the water pressure in said system, each of said water pressure sensing means including a second output.

5. The system set forth in claim 4 further including:

K) an air ozone concentration analyzer that measures the concentration of ozone in the air surrounding said system and including a third output.

6. The system set forth in claim 5 further including:

L) computer means for controlling the operation of said pump means, bypass valve unit and ozone generator, within predetermined limits that permit the accurate adjustment of ozone concentration levels for the water exiting said second outlet.

* * * * *